(12) United States Patent
Eritate et al.

(10) Patent No.: US 8,981,037 B2
(45) Date of Patent: Mar. 17, 2015

(54) POLYESTER RESIN, METHOD OF PRODUCING THE RESIN, AND MOLDING PRODUCT

(75) Inventors: Shinji Eritate, Kawasaki (JP); Toshinari Miura, Kawasaki (JP); Takeshi Komuro, Matsudo (JP); Kie Yutaka, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 322 days.

(21) Appl. No.: 13/318,561

(22) PCT Filed: May 26, 2010

(86) PCT No.: PCT/JP2010/059295
§ 371 (c)(1),
(2), (4) Date: Nov. 2, 2011

(87) PCT Pub. No.: WO2010/140599
PCT Pub. Date: Dec. 9, 2010

(65) Prior Publication Data
US 2012/0065356 A1    Mar. 15, 2012

(30) Foreign Application Priority Data
Jun. 3, 2009 (JP) ................................. 2009-133826

(51) Int. Cl.
C08G 69/44  (2006.01)
C08G 63/685  (2006.01)
C08G 69/00  (2006.01)

(52) U.S. Cl.
CPC ............ *C08G 63/6856* (2013.01); *C08G 69/44* (2013.01)
USPC .......................................... 528/291; 528/288

(58) Field of Classification Search
CPC ............................. C08G 69/44; C08G 63/6856
USPC .................................................. 528/288, 291
See application file for complete search history.

(56) References Cited

U.S. PATENT DOCUMENTS
2009/0124763 A1    5/2009 Matsuda et al.
2010/0174044 A1    7/2010 Eritate FOREIGN PATENT DOCUMENTS
JP    59-102922    *    6/1984
JP    59-102922 A         6/1984
JP    2007-146153 A       6/2007
JP    2008-291244    *   12/2008
JP    2008-291244 A     12/2008

* cited by examiner

*Primary Examiner* — Ling Choi
*Assistant Examiner* — Gennadiy Mesh
(74) *Attorney, Agent, or Firm* — Fitzpatrick, Cella, Harper & Scinto

(57) ABSTRACT

A polyester resin that includes a furandicarboxylate, has excellent heat resistance, and can be used for producing a molding product. The polyester resin is provided by copolymerizing a diol having an amino group. The polyester resin includes a structural unit represented by formulae formula (1) and a structural unit represented by formula (2) that has an amide bond:

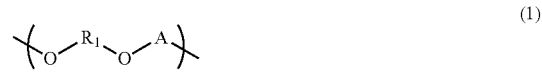

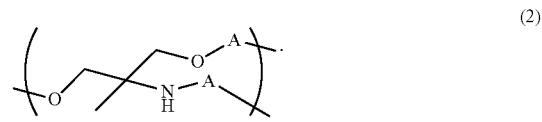

where: $R_1$ represents an aromatic hydrocarbon group which may be substituted, or an aliphatic hydrocarbon group which may be substituted; and A represents a furandicarboxylic acid residue of formula (3):

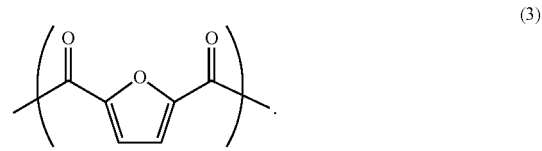

wherein the polyester resin contains the structural unit represented by the formula (2) in an amount from 3.8 mol % to 9.7 mol % with respect to a total of the structural units represented by the formulae (1) and (2).

4 Claims, 5 Drawing Sheets

POLYESTER RESIN, METHOD OF PRODUCING THE RESIN, AND MOLDING PRODUCT

This application claims the benefit of Japanese Patent Application No. 2009-133826, filed Jun. 3, 2009, which is hereby incorporated by reference herein in its entirety.

TECHNICAL FIELD

The present invention relates to a polyester resin useful for various resin materials, a method of producing the polyester resin, and a molding product.

BACKGROUND ART

Polymer materials typified by, for example, polyolefin resin-, polyester resin-, polyamide resin-, polyacrylate resin-, polycarbonate resin-, and polyimide resin-based materials have been widely utilized as various industrial materials. Those general-purpose polymer materials are each excellent in mechanical physical properties such as heat resistance and impact resistance, but each hardly decompose under a natural environment, so each of the materials remains in the ground semipermanently when buried in the ground.

Meanwhile, biodegradable materials have been attracting attention in recent years, and the development of biodegradable resins such as an aliphatic polyester resin has been actively performed. Plant-derived resins have been attracting attention because of their potential to serve as carbon-neutral materials since carbon dioxide produced by the decomposition of the resins may be such that carbon dioxide originally present in the air is fixed.

Of the plant-derived resins, polylactic acid has been mainly applied to, for example, packages for OA systems and home appliances, automobile parts, bottles, films, sheets, and eating utensils. In general, however, heat resistance is often needed in those applications. The polylactic acid, which is an aliphatic polyester resin, has a glass transition temperature (Tg) of about 57 to 60° C., and does not have sufficient heat resistance. Therefore, at present, it is difficult to use the polylactic acid, which has low heat resistance, so the polylactic acid has been actually finding use in limited applications. There has been a growing demand from the industrial world for a plant-derived resin with improved heat resistance because the resin can be expected to find use in a variety of applications. Accordingly, various kinds of contrivance have been made for improving the heat resistance of a plant-derived resin.

To be specific, a polyester resin using a plant-derived material has been reported as one approach to improving the heat resistance of a plant-derived resin (Japanese Patent Application Laid-Open No. 2007-146153).

DISCLOSURE OF THE INVENTION

Japanese Patent Application Laid-Open No. 2007-146153 describes a resin having a furan ring-containing skeleton structure, in which the degree of polymerization is specified so that its mechanical physical properties may be improved. However, it cannot be said that the improvement in heat resistance achieved by the method described in Japanese Patent Application Laid-Open No. 2007-146153 is always sufficient. Accordingly, an additional improvement in heat resistance of the plant-derived resin has been requested in order that the resin may be able to find use in a variety of applications.

The present invention has been made in view of such background art, and an object of the present invention is to provide a novel polyester resin that can be used for producing a molding product excellent in heat resistance, and a method of producing the polyester resin.

Another object of the present invention is to provide various molding products each excellent in heat resistance by using the polyester resin.

A polyester resin which solves the above-mentioned problems includes: structural units (repeating units) represented by the following formulae (1) and (2):

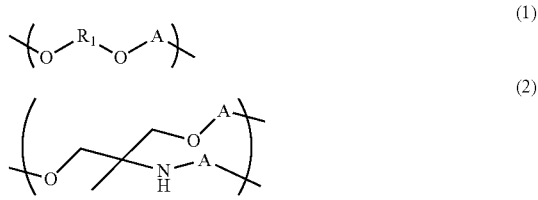

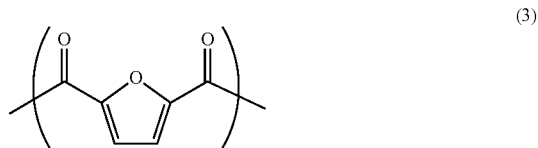

where: $R_1$ represents an aromatic hydrocarbon group which may be substituted, or an aliphatic hydrocarbon group which may be substituted; and A represents the formula (3):

in which the polyester resin contains the structural unit represented by the formula (2) in an amount of 3.8 mol % or more to 9.7 mol % or less with respect to the total of the structural units represented by the formulae (1) and (2).

Further, a molding product which solves the above-mentioned problems is obtained by molding a composition for a molding product containing the polyester resin.

Further, a method of producing a polyester resin which solves the above-mentioned problems includes copolymerizing one of a furandicarboxylic acid and an ester of the acid with ethylene glycol and 2-amino-2-methyl-1,3-propanediol, in which 2-amino-2-methyl-1,3-propanediol is used in an amount of 16 mol % or more to 40 mol % or less with respect to one of the furandicarboxylic acid and the ester of the acid.

The present invention can provide a polyester resin being excellent in heat resistance and being suited to various materials for producing a molding product, and a method of producing the polyester resin.

Further features of the present invention will become apparent from the following description of exemplary embodiments with reference to the attached drawings.

BEST MODE FOR CARRYING OUT THE INVENTION

Figure 1:
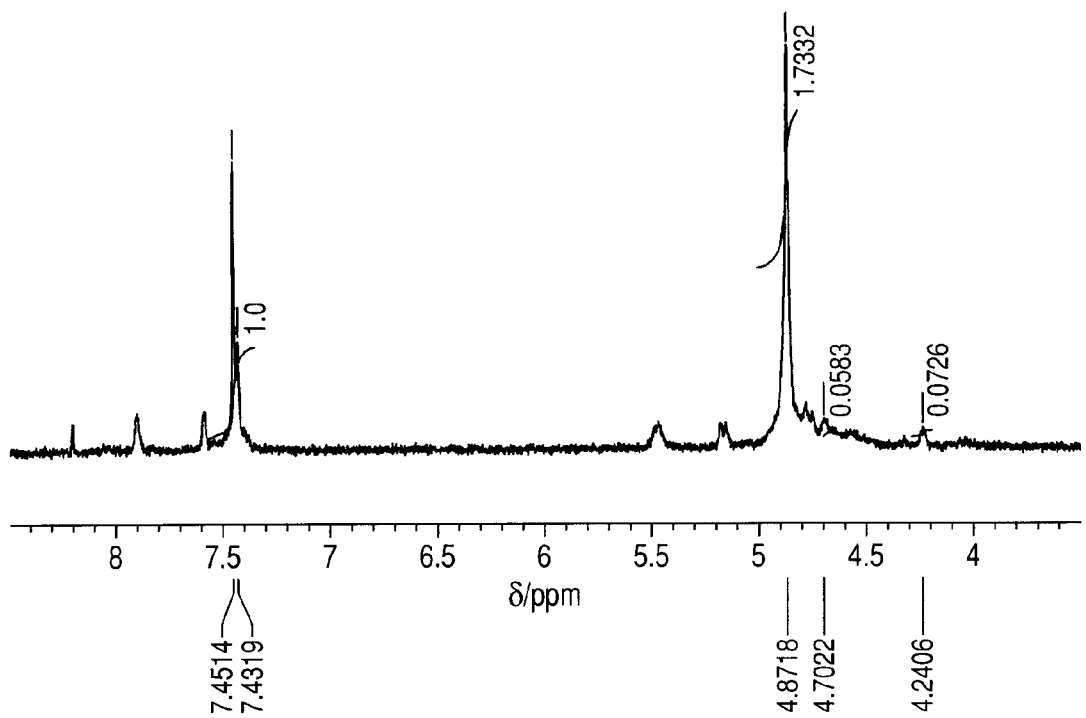
FIG. 1 is a view illustrating the spectrum of a polyester resin of Example 1 of the present invention by proton nuclear magnetic resonance spectrometry ($^1$H-NMR) measurement.
Figure 2:
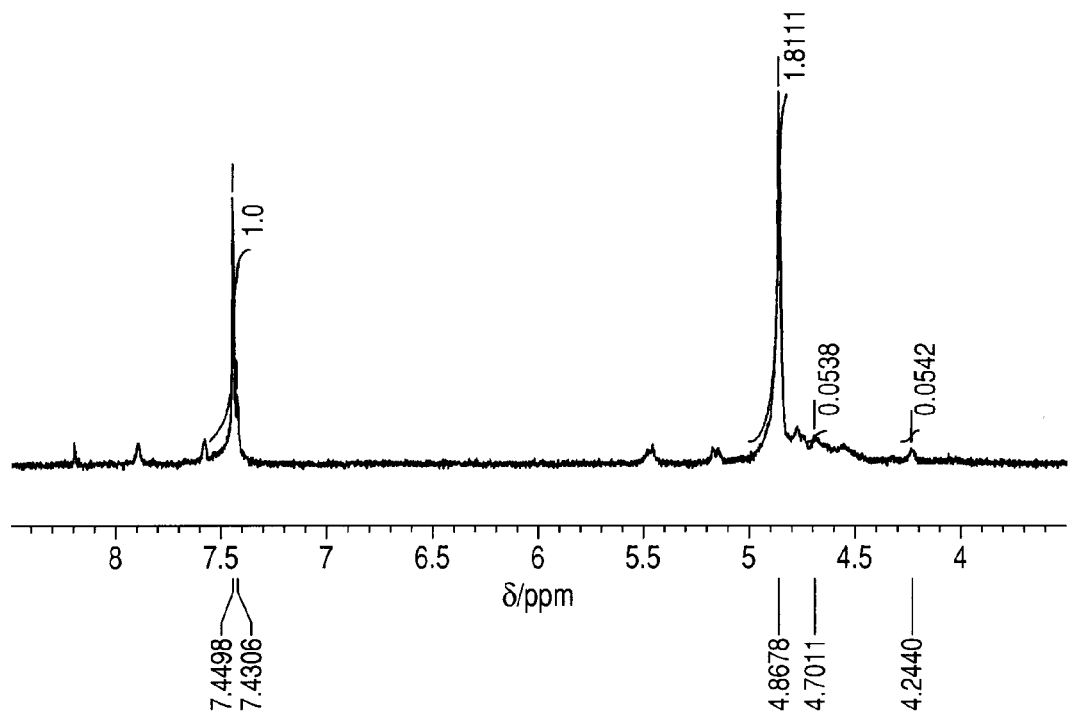
FIG. 2 is a view illustrating the spectrum of a polyester resin of Example 2 of the present invention by $^1$H-NMR measurement.
Figure 3:
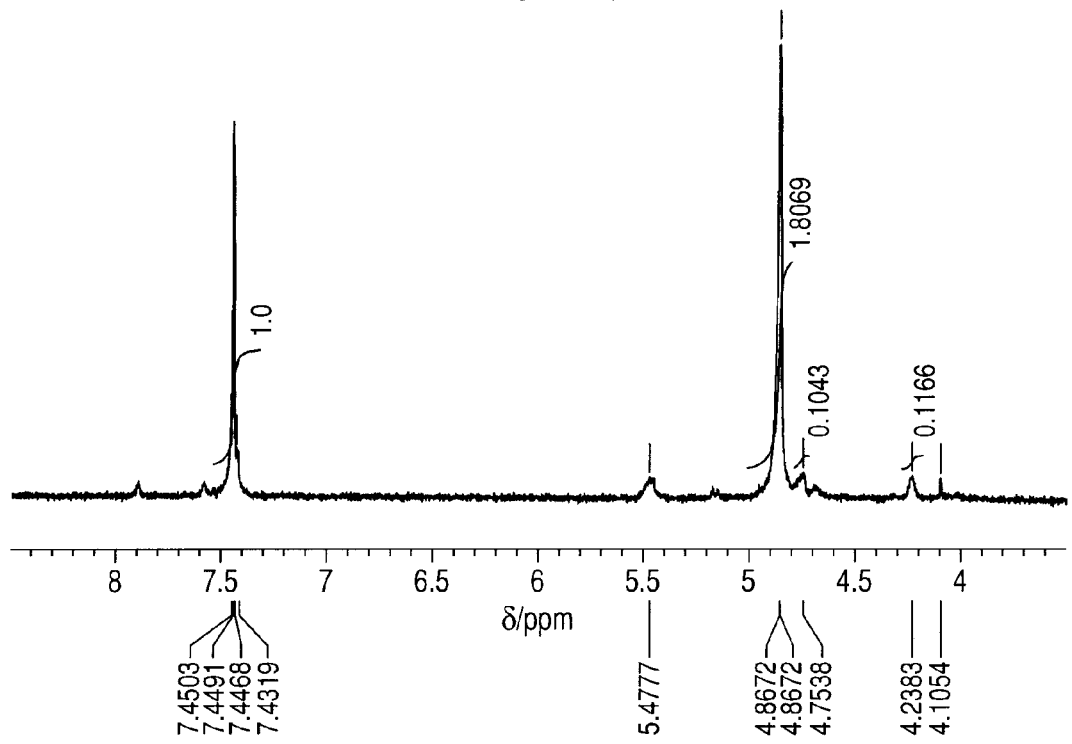
FIG. 3 is a view illustrating the spectrum of a polyester resin of Example 3 of the present invention by $^1$H-NMR measurement.
Figure 4:
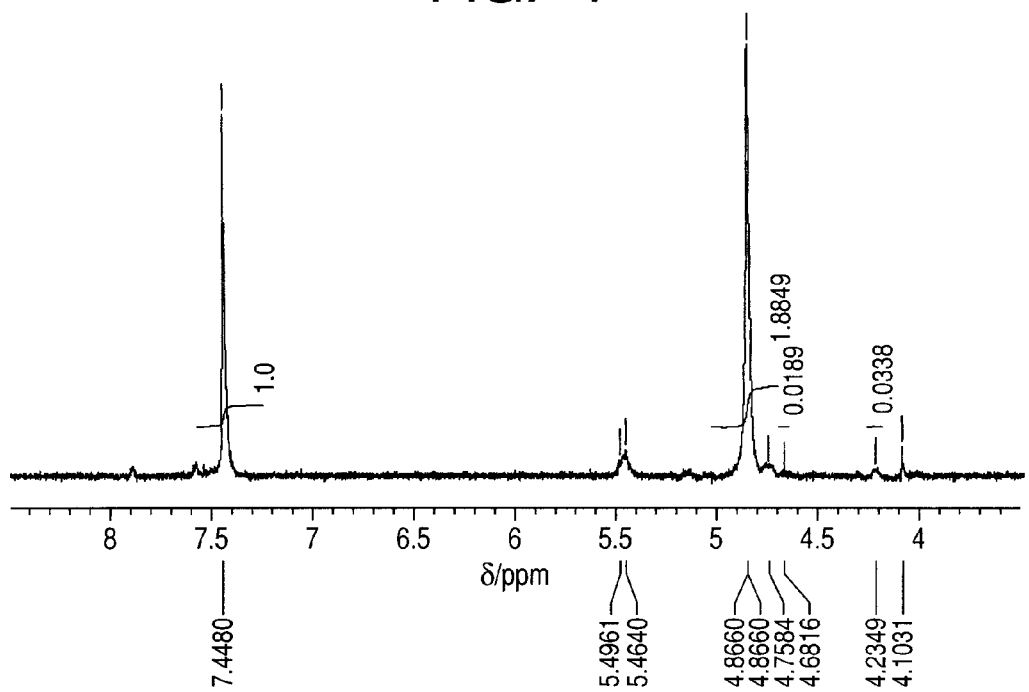
FIG. 4 is a view illustrating the spectrum of a polyester resin of Example 4 of the present invention by $^1$H-NMR measurement.
Figure 5:
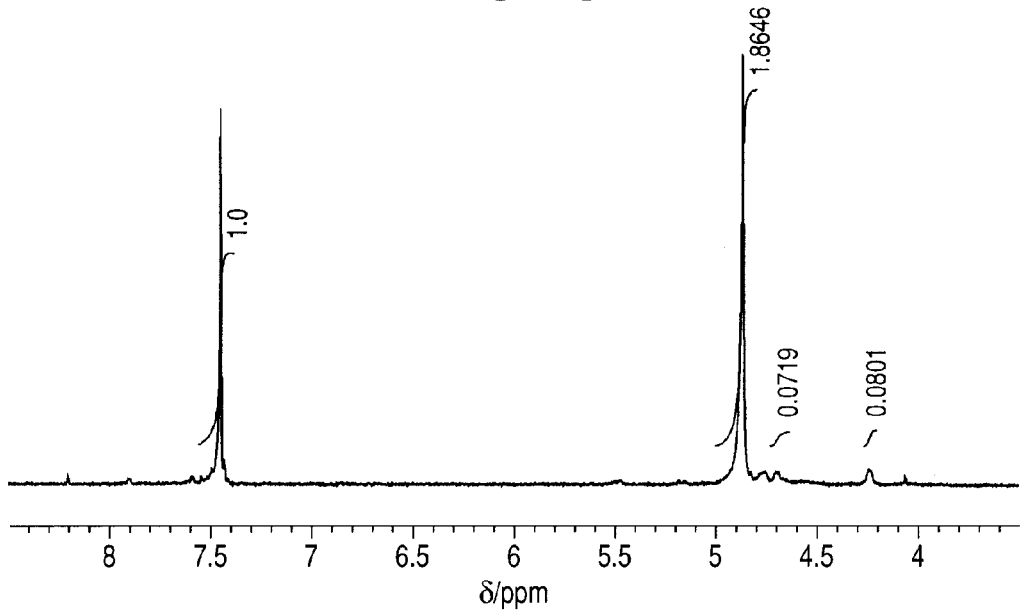
FIG. 5 is a view illustrating the spectrum of a polyester resin of Comparative Example 1 of the present invention by $^1$H-NMR measurement.
Figure 6:
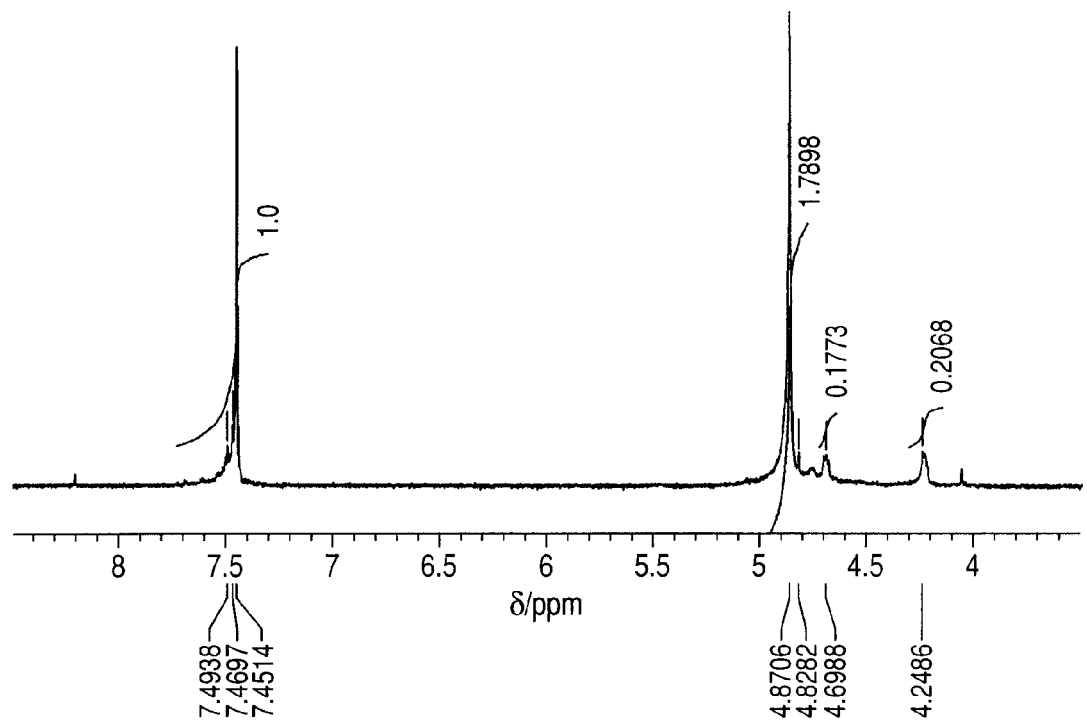
FIG. 6 is a view illustrating the spectrum of a polyester resin of Comparative Example 2 of the present invention by $^1$H-NMR measurement.
Figure 7:
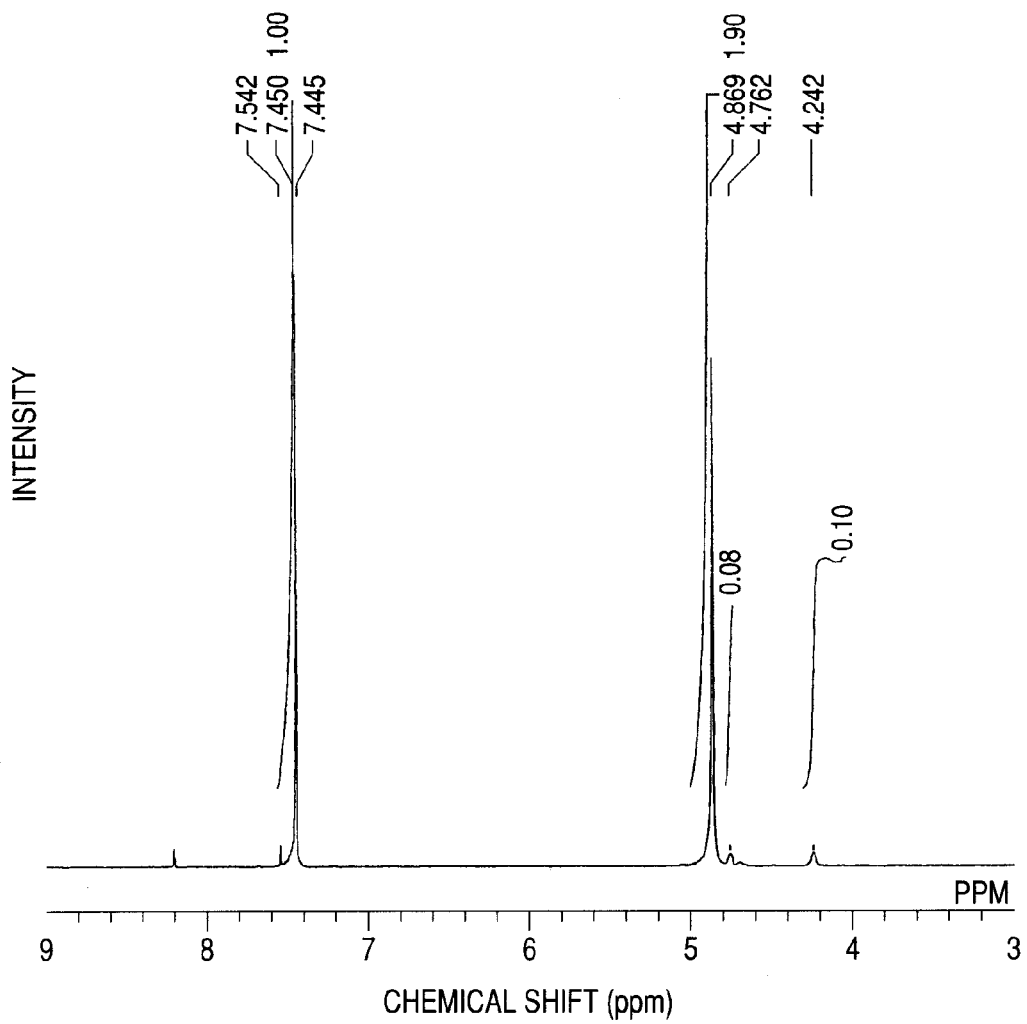
FIG. 7 is a view illustrating the spectrum of a polyester resin of Comparative Example 3 of the present invention by $^1$H-NMR measurement.

Hereinafter, the present invention is described in detail.

As a result of extensive studies, the inventors of the present invention have found that the above-mentioned objects can be achieved by copolymerizing desired components. Thus, the inventors have completed the present invention. That is, the present invention is characterized in that a crosslinked structure and an amide bond showing heat resistance are introduced by copolymerizing 2-amino-2-methyl-1,3-propanediol.

It has been found that, in the case where 2-amino-2-methyl-1,3-propanediol is used as a diol component having an amino group, heat resistance is improved by a crosslinked structure and an amide bond showing heat resistance when a ratio of the structural unit represented by the formula (2) described above to the total of the formulae (1) and (2) is 3.8 mol % or more to 9.7 mol % or less.

In addition, the inventors have found that a molding product having excellent heat resistance can be obtained by using the polyester resin as a composition for a molding product. The inventors have completed the present invention based on such finding.

The polyester resin of the present invention includes: structural units represented by the following formulae (1) and (2):

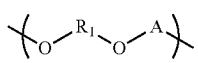

(1)

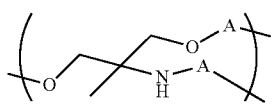

(2)

where: $R_1$ represents an aromatic hydrocarbon group which may be substituted, or an aliphatic hydrocarbon group which may be substituted; and A represents the formula (3):

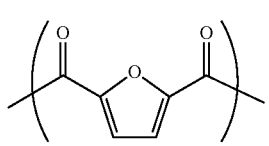

(3)

in which the polyester resin contains the structural unit represented by the formula (2) in an amount of 3.8 mol % or more to 9.7 mol % or less with respect to the total of structural units represented by the formulae (1) and (2).

In the polyester resin of the present invention, $R_1$ in the formula (1) preferably represents an ethylene group.

The molding product of the present invention is obtained by molding the composition for a molding product containing the polyester resin.

The method of producing a polyester resin according to the present invention includes copolymerizing one of a furandicarboxylic acid and an ester of the acid with ethylene glycol and 2-amino-2-methyl-1,3-propanediol, in which 2-amino-2-methyl-1,3-propanediol is used in an amount of 16 mol % or more to 40 mol % or less with respect to one of the furandicarboxylic acid and the ester of the acid.

The polyester resin having the structural units represented by the formulae (1) and (2) contains a crosslinked structure and a portion having an amide bond showing heat resistance. A molding product produced by using the polyester resin has high heat resistance.

2,5-furandicarboxylic acid and esters of 2,5-furandicarboxylic acid are used as raw materials for the dicarboxylic acid having a furan ring. Examples of the esters of furandicarboxylic acid which may be used include dimethyl 2,5-furandicarboxylate, diethyl 2,5-furandicarboxylate, ethylmethyl 2,5-furandicarboxylate, dipropyl 2,5-furandicarboxylate, dibutyl 2,5-furandicarboxylate, and mixtures thereof. A product obtained by transforming a biomass such as cellulose, glucose, fructose, or mucic acid by a known method can be used as 2,5-furandicarboxylic acid. Accordingly, the use of a furan ring allows one to use a plant-derived material as an aromatic ring which contributes to the heat resistance.

$R_1$ in the formula (1) represents an aromatic hydrocarbon group or a linear or cyclic aliphatic hydrocarbon group, which may have a substituent. Examples of the aromatic hydrocarbon group include condensed rings such as a naphthalene ring, an indene ring, an anthracene ring, and a phenanthrene ring, and heterocyclic divalent groups, in addition to a benzene ring, a biphenyl ring, and a bis(phenyl)alkane. Examples of the bis(phenyl)alkane include bis(2-hydroxyphenyl)methane and 2,2'-bis(hydroxyphenyl)propane. Meanwhile, examples of the heterocyclic ring include: five-membered rings such as furan, thiophene, pyrrole, oxazole, thiazole, and imidazole; six-membered rings such as pyran, pyridine, pyridazine, pyrimidine, and pyrazine; and condensed rings such as indole, carbazole, coumarin, quinoline, isoquinoline, acridine, benzothiazole, quinolixane, and purine.

Examples of the linear aliphatic hydrocarbon group represented by $R_1$ in the formula (1) include an ethylene group, a propylene group, an n-butylene group, an n-pentylene group, an n-hexylene group, and an n-heptylene group. Of those, linear alkylene groups having 2 to 4 carbon atoms, i.e., an ethylene group, a propylene group, and an n-butylene group are preferred, and an ethylene group and an n-butylene group is particularly preferred.

Examples of the cyclic aliphatic hydrocarbon group represented by $R_1$ in the formula (1) include divalent groups obtained from a cycloalkylene group and a cycloalkenyl group. Examples of the cycloalkylene group include a cyclopentylene group, a cyclohexylene group, a cycloheptylene group, a cyclooctylene group, a cyclononylene group, and a cyclodecylene group. In addition, examples of the cycloalkenyl group include a cyclobutenyl group, a cyclopentenyl group, a cyclohexenyl group, a cycloheptenyl group, and a cyclooctenyl group.

The polyester resin of the present invention desirably has a number average molecular weight in the range of 10,000 or more to 160,000 or less, which is measured by a gel permeation chromatography (GPC) method including dissolving the resin in 1,1,1,3,3,3-hexafluoro-2-propanol (HFIP). A number average molecular weight of 10,000 or more is preferred because the resin shows excellent mechanical characteristics. A number average molecular weight of 160,000 or less is preferred too because the resin can be easily molded. The number average molecular weight more preferably ranges from 12,000 or more to 140,000 or less.

The polyester resin having the structural units represented by the formulae (1) and (2) of the present invention can be synthesized by subjecting ethylene glycol, 2-amino-2-methyl-1,3-propanediol, and the furandicarboxylic acid or the ester of the acid to polycondensation in the presence of an excess amount of a polyhydric alcohol.

Further, examples of the polyhydric alcohol include one represented by the following formula (4):

R'—(OH)a        (4)

In the formula (4), a, which may represent an integer of 2 or more, preferably represents 2 in order that a polyester resin having the structural units represented by the general formulae (1) to (3) may be obtained. In the formula, R' represents an aromatic hydrocarbon group which may be substituted, or an aliphatic hydrocarbon group which may be substituted. To be specific, R' represents the same group as that represented by $R_1$ in the formula (1).

Specific examples of the dihydric alcohol include: linear or cyclic aliphatic diols such as ethylene glycol, 1,3-propanediol, 1,4-butanediol, and 1,4-cyclohexanedimethanol; dihydroxybenzenes such as 1,3-dihydroxybenzene and 1,4-dihydroxybenzene; bisphenols such as bis(2-hydroxyphenyl)methane, 2,2'-bis(hydroxyphenyl)propane, and 2,2'-bis(4-hydroxyphenyl)-sulfone; glycerin; trimethylolpropane; pentaerythritol; sorbitol; saccharides; hydroxybenzoic acid; and alicyclic diols such as 1,2-cyclohexanediol, 1,4-cyclohexanediol, 1,1-cyclohexanedimethylol, and 1,4-cyclohexanedimethylol. Those diols may be appropriately used in combination.

Of those, ethylene glycol, 1,3-propanediol, and 1,4-butanediol are preferably used. In the polycondensation reaction upon synthesis of the polyester resin, the reaction must be advanced by removing the excess dihydric alcohol or a dihydric alcohol produced in association with the progress of the polycondensation reaction by distillation at the time of a pressure reduction. Ethylene glycol, 1,3-propanediol, and 1,4-butanediol have relatively low boiling points among the dihydric alcohols. Accordingly, when ethylene glycol, 1,3-propanediol, or 1,4-butanediol is used, the excess dihydric alcohol or the dihydric alcohol produced in association with the progress of the polycondensation reaction can be easily removed by distillation at the time of a pressure reduction, and hence the polycondensation reaction can be further advanced.

At the time of the synthesis of the polyester resin having the structural units represented by the formulae (1) and (2) of the present invention, the amount of 2-amino-2-methyl-1,3-propanediol is determined depending on the amount of the furandicarboxylic acid or the ester of the acid.

A polycondensation method for 2-amino-2-methyl-1,3-propanediol, the dihydric alcohol, and the furandicarboxylic acid is, for example, a method including directly subjecting them to polycondensation. Alternatively, the method is, for example, a method (ester exchange method) including synthesizing an ester of 2-amino-2-methyl-1,3-propanediol, the dihydric alcohol, and the furandicarboxylic acid, and subjecting the ester to polycondensation. Examples of the polycondensation method for 2-amino-2-methyl-1,3-propanediol, the dihydric alcohol, and the furandicarboxylic acid include solution polymerization, bulk polymerization, suspension polymerization, and emulsion polymerization; each of those methods can be appropriately selected in accordance with a molding product to be produced. A polymerization temperature, a polymerization catalyst, a medium such as a solvent, and the like can be appropriately selected in accordance with each polymerization method.

The polycondensation method for 2-amino-2-methyl-1,3-propanediol, the dihydric alcohol, and the furandicarboxylic acid preferably includes an esterification step and a subsequent step of subjecting the resultant ester compound to polycondensation.

Examples of the method for the polycondensation include: a direct polycondensation method including directly causing the alcohol and the dicarboxylic acid to react with each other; and an ester exchange method including subjecting the ester and the alcohol to ester exchange to perform polymerization.

The direct polycondensation method is credited with making it difficult to obtain a polymerized product unless the usages of raw materials are strictly controlled.

On the other hand, in the ester exchange method, the dihydric alcohol as a raw material is used in a large amount as compared with the usage of the dicarboxylic acid, and polymerization is advanced by an ester exchange reaction. The excess dihydric alcohol or the dihydric alcohol produced in association with the progress of the polycondensation reaction is removed to the outside of a reaction system.

Accordingly, the ester exchange method is credited with facilitating the polymerization as compared with the direct polycondensation because the dihydric alcohol has only to be used in an excess amount as compared with the usage of the dicarboxylic acid. That is, the ester exchange method by which a polymerized polyester resin can be easily obtained is more preferably employed as the method for the polycondensation, though each of the direct polycondensation and the ester exchange method can be employed.

In the esterification step, the ester compound is obtained by heating 2-amino-2-methyl-1,3-propanediol, the dihydric alcohol, the furandicarboxylic acid or the ester of the acid, and a catalyst to 110° C. to 200° C. or preferably 150° C. to 185° C. while stirring the mixture.

The temperature is preferably increased in a stepwise fashion in the range of 110° C. to 200° C. in order that the ester compound may be obtained. That is, the reaction can be advanced from a low temperature in several stages differing from each other in temperature. To be specific, the following step can be used. That is, the temperature is held at a certain value for about 1 to 3 hours. After that, the temperature is increased to a next heating temperature, and is then held at the value for about 1 to 3 hours so that a dehydration reaction may be advanced.

Regarding a use amount of 2-amino-2-methyl-1,3-propanediol, it is preferred that a molar ratio of the furandicarboxylic acid or the ester thereof to 2-amino-2-methyl-1,3-propanediol is 1:0.16 to 0.40. When the ratio of 2-amino-2-methyl-1,3-propanediol is less than 0.16, a crosslinked structure capable of showing sufficient heat resistance and an amide bond showing heat resistance cannot be formed. In addition, the ratio of more than 0.40 is not preferred because a crosslinked structure is formed to an excess degree and the formation impairs the thermoplasticity of the resin.

Regarding a use amount of the dihydric alcohol, it is preferred that a molar ratio of the furandicarboxylic acid or the ester thereof to the dihydric alcohol is 1:1 to 3. An excessive amount of the dihydric alcohol, or a dihydric alcohol to be produced in association with the progress of the polycondensation reaction can be removed to the outside of a reaction system by reducing the pressure in the reaction system to remove the dihydric alcohol by distillation, subjecting the dihydric alcohol and any other solvent to azeotropy to remove the dihydric alcohol by distillation; or any other method.

In the production method for a polyester resin of the present invention, other monomers other than the furandicarboxylic acid and the ester of the acid, 2-amino-2-methyl-1,3-propanediol, polyhydric alcohols may be used.

Examples of the other monomers include dicarboxylic acid components including: aromatic dicarboxylic acids such as terephthalic acid, isophthalic acid, naphthalene dicarboxylic acid, 4,4'-diphenyl sulfone dicarboxylic acid, and 4,4'-biphenyl dicarboxylic acid; alicyclic dicarboxylic acids such as 1,4-cyclohexane dicarboxylic acid; aliphatic dicarboxylic acids each having an aromatic ring such as 1,3-phenylene dioxydiacetic acid; aliphatic dicarboxylic acids such as succinic acid, adipic acid, sebacic acid, and diglycolic acid; and esters of the dicarboxylic acids; hydroxycarboxylic acid components such as p-hydroxybenzoic acid, 4-(2-hydroxyethoxy)benzoic acid, glycolic acid, and lactic acid; and lactones such as caprolactone, butyrolactone, and valerolactone.

Further examples of the other monomers include: vinyl compounds such as styrene, vinyltoluene, α-methylstyrene, chlorstyrene, dichlorstyrene, vinylnaphthalene, ethyl vinyl ether, methyl vinyl ketone, methyl acrylate, ethyl acrylate, methyl methacrylate, acrylonitrile, and methacrylonitrile; and allyl compounds such as diallyl phthalate, diallyl fumarate, diallyl succinate, and triallyl cyanurate.

One kind of them may be used alone, or two or more kinds of them may be used in combination.

In addition, the other monomer is added in an amount of preferably 50 parts by weight or less, or more preferably 5 parts by weight or less with respect to 100 parts by weight of the total raw materials.

Although the reaction proceeds by virtue of the autocatalytic action of the dicarboxylic acid even when the catalyst is not added, the catalyst is preferably added because the concentration of the dicarboxylic acid reduces in association with the progress of the reaction. Preferred examples of the catalyst to be used include: metal oxides and metal salts; organometallic compounds formed of tin, lead, titanium, and the like; and tetravalent hafnium compounds such as hafnium (IV) chloride and hafnium(IV) chloride.(THF)$_2$.

The endpoint of the esterification step is the time point at which the reaction mixture becomes transparent, and the endpoint can be easily identified.

In the subsequent polycondensation step, the reaction system is heated to a temperature in the range of 180° C. to 280° C., or preferably 180° C. to 240° C., and then the polycondensation reaction is initiated. The polycondensation reaction is preferably performed in vacuo. An optimum catalyst for the polycondensation is specifically, for example, any one of the following compounds: acetates and carbonates of lead, zinc, manganese, calcium, cobalt, magnesium, and the like, metal oxides of magnesium, zinc, lead, antimony, and the like, and organometallic compounds formed of tin, lead, titanium, and the like. Alternatively, a titanium alkoxide can be used as a catalyst effective for both the steps. The time point at which the catalyst is added is as follows: the catalyst may be added in each of the esterification step and the polycondensation step separately, or the catalyst in the polycondensation step may be added from the outset. Upon addition of the catalyst, the furandicarboxylic acid and the dihydric alcohol may be heated as required, or the catalyst may be added in multiple portions.

In the polycondensation reaction subsequent to the esterification, the polycondensation reaction can be promoted by removing an excessive amount of the dihydric alcohol which was not consumed in the esterification step, or a dihydric alcohol produced as a by-product from the reaction system. The dihydric alcohol can be removed to the outside of the reaction system by a method such as a method including reducing the pressure in the reaction system to remove the dihydric alcohol by distillation, or a method including subjecting the dihydric alcohol and any other solvent to azeotropy to remove the dihydric alcohol by distillation. In addition, solid phase polymerization can be performed by a known method after a polymer has been obtained by the polycondensation reaction.

The polyester resin of the present invention obtained in such polycondensation step has a number average degree of polymerization of 50 or more to 700 or less, or preferably 60 or more to 600 or less.

Further, the molecular weight of the polyester resin of the present invention is measured by a gel permeation chromatography (GPC) method including dissolving the resin in 1,1,1,3,3,3-hexafluoro-2-propanol (HFIP). The number average molecular weight measured by the molecular weight measurement is 10,000 or more to 160,000 or less, or preferably 12,000 or more to 140,000 or less.

The polyester resin of the present invention is characterized by containing the structural units represented by the formulae (1) and (2). The content of the structural unit represented by the formula (2) to be incorporated into the polyester resin falls within the range of 3.8 mol % or more to 9.7 mol % or less, or preferably 4.1 mol % or more to 9.7 mol % or less with respect to the total of the structural unit represented by the formulae (1) and (2). When the content of the structural unit represented by the formula (2) is less than 3.8 mol %, a crosslinked structure capable of showing sufficient heat resistance and an amide bond showing heat resistance cannot be formed. In addition, a content of more than 9.7 mol % is not preferred because a crosslinked structure is formed to an excess degree and the formation impairs the thermoplasticity of the resin.

The polyester resin of the present invention may contain any other structural unit except the structural units represented by the formulae (1) and (2).

A composition for a molding product of the present invention contains the polyester resin. The content of the polyester resin to be incorporated into the composition for a molding product of the present invention is preferably 50 wt % or more to 100 wt % or less.

Further, the composition for a molding product of the present invention may contain an additive as required to such an extent that no functions of the polyester resin are inhibited. Specific examples of the additive include a flame retardant, a colorant, an internal release agent, an antioxidant, a UV absorber, and various fillers. The content of the additive to be incorporated into the composition for a molding product of the present invention is preferably 0.5 wt % or more to 50 wt % or less.

A molding product obtained by using the composition for a molding product is excellent in heat resistance. Thus, the molding product may be used for molding products in a wide variety of fields, such as fibers, films, sheets, and various molding products. Examples of the molding product include containers such as a bottle, pipes, tubes, sheets, plates, and films. In particular, a preferred molding product is, for example, a component for: an ink tank of an ink-jet printer; a toner container of an electrophotographic apparatus; a packaging resin; or the package of an office machine such as a copying machine or printer, or of a camera.

The molding product can be molded out of the composition for a molding product by employing the same method as a method of molding a thermoplastic resin, and, for example, compression molding, extrusion molding, or injection molding can be utilized.

The polyester resin of the present invention is specifically detailed. However, the technical scope of the present invention is not limited to the following description. It should be noted that a polyester resin in each of the following examples and comparative examples was evaluated by employing the following measurement methods.

(Molecular Weight Measurement)
Analytical instrument: High performance liquid chromatography, Alliance 2695 manufactured by Waters
Detector: A differential refractometer
Eluent: A 5-mM solution of sodium trifluoroacetate in hexafluoroisopropanol
Flow rate: 1.0 ml/min
Column temperature: 40° C.
Molecular weight: A number average molecular weight (Mn), a weight average molecular weight (Mw), and a degree of polydispersity (Mw/Mn) were determined by using a polymethyl methacrylate resin (PMMA) standard.

(NMR Measurement)
Apparatus name: A nuclear magnetic resonator JNM-ECA-400 manufactured by JEOL Ltd.
Measurement condition: $^1$H-NMR
Solvent: $CF_3COOD$ (Measurement of Glass Transition Temperature (Tg) and Melting Point (Tm))
Apparatus name: A differential scanning calorimeter Q1000 manufactured by TA Instruments
Pan: An aluminum pan
Sample weight: 3 mg
Temperature at which temperature increase is initiated:
  30° C.
Rate of temperature increase:
  10° C./min
Atmosphere: Nitrogen (Measurement of Heat Decomposition Temperature (Td))
Apparatus name: A thermogravimetric apparatus Q500 manufactured by TA Instruments
Pan: An aluminum pan
Sample weight: 3 mg
Measurement temperature:
  50 to 500° C.
Rate of temperature increase:
  50° C./min
Measurement mode: High resolution dynamic
Atmosphere: Nitrogen
Heat decomposition temperature:
  The temperature at which the weight reduced by 10% was defined as the heat decomposition temperature.

In each of the following examples and comparative examples, the term "AMPB" represents 2-amino-2-methyl-1,3-propanediol and the term "PEF" represents poly(ethylene-2,5-furandicarboxylate). In addition, the symbol "%" for each of AMPD and PEF represents "mol %".

Example 1

Preparation of Polyester Resin (AMPD (40%)-PEF) Formed of 2-amino-2-methyl-1,3-propanediol, ethylene glycol, and 2,5-furandicarboxylic acid A 100-mL three-necked flask equipped with a temperature gauge and a stirring blade made of stainless steel was prepared. Loading into the three-necked flask was performed so that a ratio of AMPD to 2,5-furandicarboxylic acid might be 40 mol %. In other words, 2,5-furandicarboxylic acid (7.81 g), ethylene glycol (8.07 g), 2-amino-2-methyl-1,3-propanediol (2.10 g), a monobutyltin oxide catalyst (0.014 g), and a titanium n-butoxide catalyst (0.014 g) were added.

Stirring was initiated in the three-necked flask while nitrogen was introduced. At the same time, the temperature of those contents was increased with an oil bath. After the temperature inside the flask had reached 160° C., the temperature was held at the value for 1 hour, and was then held at 165° C. for 1 hour and at 185° C. for 2 hours.

A pressure reduction was initiated at 185° C. and the pressure was reduced to about 133 Pa over about 1 hour. Further, the temperature was increased to 230° C. A reaction was continued at about 133 Pa and 230° C. for 4.5 hours. Thus, AMPD (40%)-PEF was prepared. Calculation from an area ratio in NMR measurement showed that the resin contained 9.7 mol % of the structural unit represented by the formula (2) described above with respect to the total of the formula (1) where $R_1$ represented an ethylene group and the formula (2).

Example 2

Preparation of Polyester Resin (AMPD (30%)-PEF) Formed of 2-amino-2-methyl-1,3-propanediol, ethylene glycol, and 2,5-furandicarboxylic acid Raw materials were loaded in such loadings (usages) that a ratio of 2-amino-2-methyl-1,3-propanediol to 2,5-furandicarboxylic acid might be 30 mol %. In other words, AMPD (30%)-PEF was prepared in the same manner as in Example 1 except that 2,5-furandicarboxylic acid (7.81 g), ethylene glycol (8.38 g), 2-amino-2-methyl-1,3-propanediol (1.58 g), a monobutyltin oxide catalyst (0.019 g), and a titanium n-butoxide catalyst (0.019 g) were added. Calculation from an area ratio in NMR measurement showed that the resin contained 6.7 mol % of the structural unit represented by the formula (2) described above with respect to the total of the formula (1) where $R_1$ represented an ethylene group and the formula (2).

Example 3

Preparation of Polyester Resin (AMPD (20%)-PEF) Formed of 2-amino-2-methyl-1,3-propanediol, ethylene glycol, and 2,5-furandicarboxylic acid Raw materials were loaded in such loadings (usages) that a ratio of 2-amino-2-methyl-1,3-propanediol to 2,5-furandicarboxylic acid might be 20 mol %. In other words, AMPD (20%)-PEF was prepared in the same manner as in Example 1 except that 2,5-furandicarboxylic acid (7.81 g), ethylene glycol (8.69 g), 2-amino-2-methyl-1,3-propanediol (1.05 g), a monobutyltin oxide catalyst (0.019 g), and a titanium n-butoxide catalyst (0.019 g) were added. Calculation from an area ratio in NMR measurement showed that the resin contained 3.8 mol % of the structural unit represented by the formula (2) described above with respect to the total of the formula (1) where $R_1$ represented an ethylene group and the formula (2).

Example 4

Preparation of Polyester Resin (AMPD (16%)-PEF) Formed of 2-amino-2-methyl-1,3-propanediol, ethylene glycol, and 2,5-furandicarboxylic acid Raw materials were loaded in such loadings (usages) that a ratio of 2-amino-2-methyl-1,3-propanediol to 2,5-furandicarboxylic acid might be 16 mol %. In other words, AMPD (16%)-PEF was prepared in the same manner as in Example 1 except that 2,5-furandicarboxylic acid (7.81 g), ethylene glycol (8.81 g), 2-amino-2-methyl-1,3-propanediol (0.841 g), a monobutyltin oxide catalyst (0.019 g), and a titanium n-butoxide catalyst (0.019 g) were added. Calculation from an area ratio in NMR measurement showed that the resin contained 4.1 mol % of the structural unit represented by the formula (2) described above with respect to the total of the formula (1) where $R_1$ represented an ethylene group and the formula (2).

Comparative Example 1

Preparation of Polyester Resin (AMPD (10%)-PEF) Formed of 2-amino-2-methyl-1,3-propanediol, ethylene glycol, and 2,5-furandicarboxylic acid Raw materials were loaded in such loadings (usages) that a ratio of 2-amino-2-methyl-1,3-propanediol to 2,5-furandicarboxylic acid might be 10 mol %. In other words, AMPD (10%)-PEF was prepared in the same manner as in Example 1 except that 2,5-furandicarboxylic acid (7.81 g), ethylene glycol (9.36 g), 2-amino-2-methyl-1,3-propanediol (0.526 g), a monobutyltin oxide catalyst (0.019 g), and a titanium n-butoxide catalyst (0.019 g) were added. Calculation from an area ratio in NMR measurement showed that the resin contained 2.8 mol % of the structural unit represented by the formula (2) described above with respect to the total of the formula (1) where $R_1$ represented an ethylene group and the formula (2).

Comparative Example 2

Preparation of Polyester Resin (AMPD (2%)-PEF) Formed of 2-amino-2-methyl-1,3-propanediol, ethylene glycol, and 2,5-furandicarboxylic acid Raw materials were loaded in such loadings (usages) that a ratio of 2-amino-2-methyl-1,3-propanediol to 2,5-furandicarboxylic acid might be 2 mol %. In other words, AMPD (2%)-PEF was prepared in the same manner as in Example 1 except that 2,5-furandicarboxylic acid (7.81 g), ethylene glycol (9.36 g), 2-amino-2-methyl-1,3-propanediol (0.105 g), a monobutyltin oxide catalyst (0.019 g), and a titanium n-butoxide catalyst (0.019 g) were added. Calculation from an area ratio in NMR measurement showed that the resin contained 1.7 mol % of the structural unit represented by the formula (2) described above with respect to the total of the formula (1) where $R_1$ represented an ethylene group and the formula (2).

Comparative Example 3

Preparation of poly(ethylene-2,5-furandicarboxylate) (PEF)

Preparation was performed in the same manner as in Example 1 except that 2,5-furandicarboxylic acid (7.81 g), ethylene glycol (9.36 g), a monobutyltin oxide catalyst (0.014 g), and a titanium n-butoxide catalyst (0.014 g) were loaded (used) as raw materials. Thus, PEF was prepared.

Comparative Example 4

Preparation of Polyester Resin (AMPD (50%)-PEF) Formed of 2-amino-2-methyl-1,3-propanediol, ethylene glycol, and 2,5-furandicarboxylic acid Raw materials were loaded in such loadings (usages) that a ratio of 2-amino-2-methyl-1,3-propanediol to 2,5-furandicarboxylic acid might be 50 mol %. In other words, a reaction was performed in the same manner as the preparation in Example 1 except that 2,5-furandicarboxylic acid (7.81 g), ethylene glycol (7.76 g), 2-amino-2-methyl-1,3-propanediol (2.63 g), a monobutyltin oxide catalyst (0.019 g), and a titanium n-butoxide catalyst (0.019 g) were added.

Stirring was initiated in the three-necked flask while nitrogen was introduced. At the same time, the temperature of those contents was increased with an oil bath. After the temperature inside the flask had reached 160° C., the temperature was held at the value for 1 hour, and was then held at 165° C. for 1 hour and at 185° C. for 2 hours.

A pressure reduction was initiated at 185° C. and the pressure was reduced to about 133 Pa over about 1 hour. Further, the temperature was increased to 230° C. When a reaction was continued at about 133 Pa and 230° C. for 3 hours, the contents gelled, and hence AMPD (50%)-PEF formed of 2-amino-2-methyl-1,3-propanediol, ethylene glycol, and 2,5-furandicarboxylic acid could not be obtained.

Table 1 shows the results of the measurement of a glass transition temperature (Tg), the measurement of a molecular weight, and the measurement of a degree of crosslinking in Examples 1, 2, 3, and 4, and Comparative Examples 1, 2, and 3.

TABLE 1

| Lot | Sample | Tg/° C. | Molecular weight of soluble matter | | | (2)/(1) + (2) × 100 |
| --- | --- | --- | --- | --- | --- | --- |
| | | | Mn/10,000 | Mw/10,000 | Mw/Mn | mol % |
| Example 1 | AMPD (40%)-PEF | 109 | 5.9 | 11.0 | 1.8 | 9.7 |
| Example 2 | AMPD (30%)-PEF | 103 | 6.8 | 11.0 | 1.6 | 6.7 |
| Example 3 | AMPD (20%)-PEF | 93 | 6.8 | 19.0 | 2.8 | 3.8 |
| Example 4 | AMPD (16%)-PEF | 96 | 3.1 | 5.9 | 1.9 | 4.1 |
| Comparative Example 1 | AMPD (10%)-PEF | 87 | 4.0 | 6.1 | 1.5 | 2.8 |
| Comparative Example 2 | AMPD (2%)-PEF | 70 | 1.9 | 2.8 | 1.4 | 1.7 |
| Comparative Example 3 | PEF | 87 | 6.5 | 9.1 | 1.4 | 0.0 |

As can be seen from Examples, the polyester resins of Examples into each of which 2-amino-2-methyl-1,3-propanediol was introduced at 3.8% or more with respect to 2,5-furandicarboxylic acid have higher glass transition temperatures than those of Comparative Examples, and hence each have improved heat resistance.

The polyester resin of the present invention can be utilized for producing a molding product excellent in heat resistance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A polyester resin, comprising structural units represented by formulae (1) and (2):

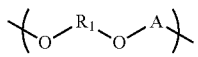
(1)

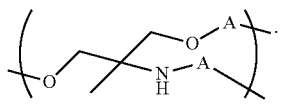
(2)

where: $R_1$ represents an aromatic hydrocarbon group which is optionally substituted, or an aliphatic hydrocarbon group which is optionally substituted; and A represents formula (3):

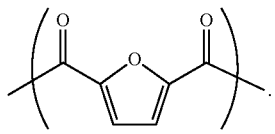
(3)

wherein the polyester resin contains the structural unit represented by the formula (2) in an amount of 3.8 mol % or more to 9.7 mol % or less with respect to a total of the structural units represented by the formulae (1) and (2), wherein a glass transition temperature of the polyester resin is 93° C. or more to 109° C. or less, and wherein the polyester resin has a number average molecular weight of 31,000 or more to 160,000 or less.

2. The polyester resin according to claim 1, wherein $R_1$ represents an ethylene group.

3. The molding product obtained by molding the polyester resin according to claim 1.

4. A method of producing a polyester resin represented by formulae (1) and (2):

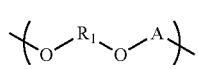
(1)

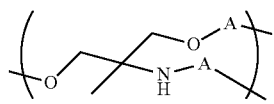
(2)

where: $R_1$ represents an aromatic hydrocarbon group which is optionally substituted, or an aliphatic hydrocarbon group which is optionally substituted; and A represents the formula (3):

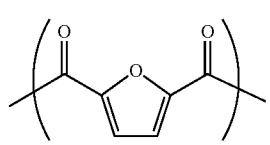
(3)

wherein the polyester resin contains the structural unit represented by the formula (2) in an amount of 3.8 mol % or more to 9.7 mol % or less with respect to a total of the structural units represented by the formulae (1) and (2), wherein a glass transition temperature of the polyester resin is 93° C. or more to 109° C. or less, and wherein the polyester resin has a number average molecular weight of 31,000 or more to 160,000 or less, the method, comprising:

reacting 2,5-furandicarboxylic acid or an ester thereof, an aromatic or an aliphatic diol, and 2-amino-2-methyl-1,3-propanediol at a molar ratio of (1):(1 to 3): (0.16 to 0.40) at 110° C. or higher to 200° C. or lower to obtain an esterified reactant; and conducting polycondensation of the esterified reactant at 180° C. or higher to 280° C. or lower.

* * * * *